United States Patent [19]

Alessio

[11] 4,170,366
[45] Oct. 9, 1979

[54] CHUCK

[75] Inventor: Lorenzo E. Alessio, Cairoli, Italy

[73] Assignee: Black & Decker Inc., Newark, Del.

[21] Appl. No.: 880,248

[22] Filed: Feb. 22, 1979

[30] Foreign Application Priority Data

Mar. 14, 1977 [IT] Italy ............................... 21180 A/77

[51] Int. Cl.$^2$ ............................................ B23B 31/04
[52] U.S. Cl. ........................................ 279/62; 279/1 Q
[58] Field of Search .................... 279/62, 1 Q, 60, 61, 279/63, 64, 1 ME, 1 K, 9; 408/226, 239, 239 A; 90/11 A

[56] References Cited

U.S. PATENT DOCUMENTS

| 913,059 | 2/1909 | Savage | 279/62 |
|---|---|---|---|
| 1,398,341 | 11/1921 | Pfunder | 279/1 K X |
| 2,139,421 | 12/1938 | Rineer | 279/62 |
| 3,910,589 | 10/1975 | Derbyshire | 279/1 Q X |

Primary Examiner—Z. R. Bilinsky

Attorney, Agent, or Firm—Walter Ottesen; Leonard Bloom; Edward D. Murphy

[57] ABSTRACT

The invention is directed to a chuck for grasping a tool such as a drill bit or the like and adapted to be tightened with the aid of a chuck key. The chuck includes a hollow body defining a longitudinal axis and having a front end for receiving the tool therein. A plurality of elongated jaws are movably mounted in the hollow body. A sleeve is rotatably mounted on the body and threadably engages the jaws to move the jaws in the body to clamp and release the tool whereby substantial radial forces are transmitted to the body by the jaws when the jaws are tightened on the tool. The sleeve extends in the direction of the longitudinal axis of the hollow body to surround the hollow body at the region of the jaws for supporting the body against the radial forces. A gear is provided for coacting with the chuck key to actuate the sleeve to move the jaws for tightening the jaws on the tool.

2 Claims, 3 Drawing Figures

CHUCK

BACKGROUND OF THE INVENTION

The invention relates to a self-centering chuck of the type having for example three or four independent jaws mounted in a hollow body for movement therein. The jaws are opened and closed by rotating a control sleeve which is threadably connected to the jaws. The chuck is utilized to tightly hold a tool bit such as a drill bit or other suitable tool or workpiece. The rotation of the control sleeve is generally controlled by means of a key inserted radially into the end portion of the hollow body of the chuck containing the jaws. The key is provided with a pinion that mates with a bevel gear formed on the end-face of the control sleeve.

In most conventional chucks, the bevel gear is formed on the end-face of the control sleeve which faces toward the front end of the hollow body whereat the tool bit held by the chuck is inserted. Therefore, the hollow body of the chuck must project out over and beyond the end of the control sleeve so as to make possible the aforementioned operation by means of the key. This projecting portion of the hollow body of the chuck has a relatively thick tapered wall because the hollow body must withstand severe radial forces transmitted to it by the jaws that tighten around the tool bit.

Most chucks have heretofore been made of metal by costly machining operations utilizing machine tools. It would be highly desirable to be able to manufacture chucks at least in part with a molded part made out of plastic for instance by means of an injection molding process.

SUMMARY OF THE INVENTION

Accordingly, it is an object of my invention to provide a self-centering chuck with independent jaws arranged in a body made as a molded part from a material such as plastic. Subsidiary to this object, it is an object of my invention to provide a chuck which is simple and less costly to produce.

The self-centering chuck according to the invention includes an external control sleeve which surrounds the body of the chuck and has a gear formed on the end-face of the sleeve facing away from the jaws and toward the tool on which the chuck is mounted. The gear is designed to mate with a pinion key or a substantially equivalent mechanical means.

The hollow body of the chuck is surrounded by the external sleeve especially at the weak portions thereof. Supported in this manner, the body can be made of plastic with enormous economic benefits and without affecting in the least the sturdiness and dependability of the tool. In fact, the radial forces which the metal jaws transmit to the hollow body of plastic within which they are slidingly guided are supported to the major part by the external metal sleeve that controls the opening and the closing of the jaws.

BRIEF DESCRIPTION OF THE DRAWING

The above objects and advantages of my invention will become more apparent from a consideration of the detailed descriptions to follow taken in conjunction with the drawing annexed hereto wherein.

DESCRIPTION OF THE PREFERRED EMBODIMENTS OF THE INVENTION

Figure 1:
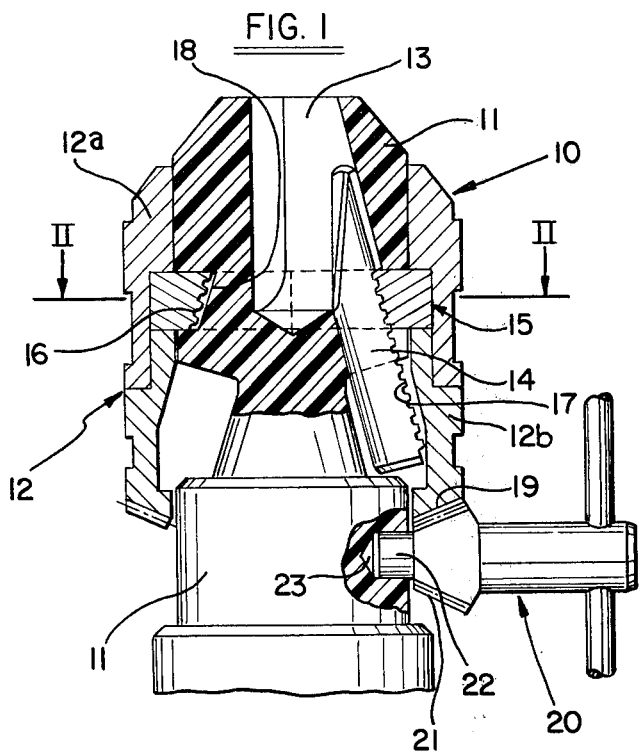
FIG. 1 is an elevation view, partially in section, of an embodiment of the chuck according to my invention.

With reference to the drawing, the chuck per se is designated by reference numeral 10 and has a body 11 preferably made of plastic, for example, by an injection molding process.

Sleeve means in the form of an external control sleeve 12 is fitted onto the body 11 in surrounding relation thereto as shown in FIG. 1. The sleeve 12 completely surrounds the body 11 particularly at the weak portion thereof whereat the body 11 is tapered to define a conical cavity 13. In the embodiment shown, the jaws 14 are three in number and are slideably guided in jaw tracks within the cavity 13. The jaws are movable along the jaw tracks with the aid of thread means in the form of a threaded coupling between the collar 15 and the jaws 14. The threaded coupling is conjointly defined by internal thread 16 of collar 15 and threaded portions 17 formed on corresponding ones of the jaws 14.

The sleeve 12 is made up of two sleeve sections 12a and 12b. The collar 15 is made up of two halves 15a and 15b so that it can be located in the groove 18 of body 11. The sleeve part 12a is press-fitted onto the sleeve part 12b and collar 15 so that the collar 15 becomes integral with the sleeve 12. The sleeve 12 with collar 15 is rotatable with respect to the body 11 so that when the sleeve 12 is rotated, the threaded coupling causes the jaws 14 to move along their respective tracks in body 11. Gear means in the form of a bevel gear 19 is formed on the lower end-face of the sleeve 12 and faces toward the tool (not shown) on which the chuck is mounted and away from the jaws 14 of the chuck 10. A key 20 is used as a control element and has pinion 21 for mating with the bevel gear 19. The key 20 is provided with a pilot 22 which, during operation, is inserted into radial apertures 23 of the body 11 of the chuck 10. When the key 20 is rotated by the operator, the sleeve 12 rotates about the body 11 to actuate the jaws 14.

Figure 2:
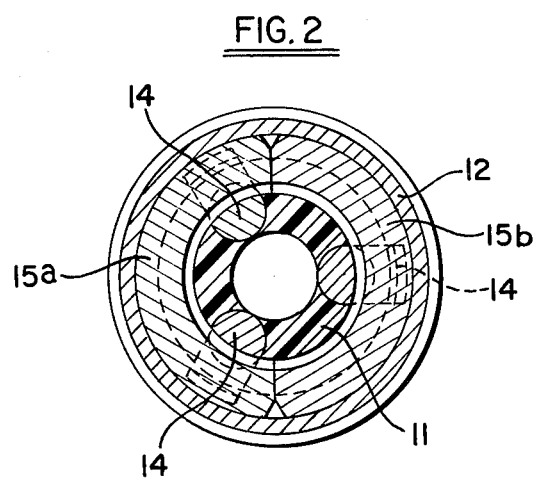
FIG. 2 is a section view taken along line II—II of FIG. 1.

In the chuck according to my invention, the control system for tightening the chuck to securely hold a drill bit or other tool is placed away from that portion of the body 11 of the chuck subjected to radial forces by the jaws. This permits the construction shown in FIGS. 1 and 2 wherein the control sleeve 12 is extended upwardly about the jaws so that the control sleeve completely surrounds the body 11 of the chuck and so braces the body 11 against these radial forces. Thus, I have placed the chuck control system at the downward end of the chuck at the lower end-face of the control sleeve 12 below the jaws 14 where the chuck body 11 has a greater cross-section and is subjected to forces which are less severe than the radial forces developed at the region of the jaws 14.

Figure 3:
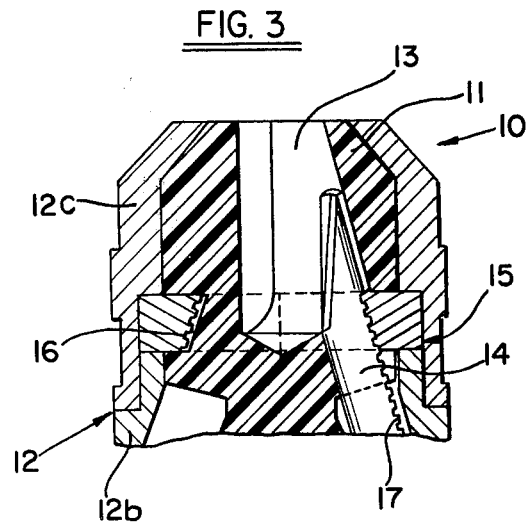
FIG. 3 is an elevation view, partially in section, showing how the control sleeve can be extended to provide added bracing to the hollow body in the region of the chuck jaws.

In FIG. 3, I show still another embodiment of my invention wherein the control sleeve 12 has a part 12c extending directly up to the forward end of the chuck 10 to afford also lateral support to the forward most end of the chuck body 11 against radial forces developed when the jaws 14 are tightened on say a drill bit.

Very substantial economic savings are realized with the chuck of my invention because the body 11 is molded rather than being machined. The chuck is mountable, for example, to the driving spindle of an electric power drill.

I claim:

1. A chuck for clamping a tool such as a drill bit or the like with the aid of a chuck key comprising:

a plastic hollow body defining a longitudinal axis and having a front end for receiving the tool therein;

a plurality of elongated jaws movably mounted in said hollow body for tightly engaging a tool whereby substantial radial forces are transmitted to said body by said jaws;

first thread means on said jaws;

a sleeve rotatably mounted on said body and having second thread means engaging said first thread means on said jaws to actuate said jaws to clamp and release the tool whereby substantial radial forces are transmitted to said body;

said sleeve being disposed in surrounding relation to said hollow body to laterally support said body against said radial forces, said sleeve extending in the direction of said longitudinal axis substantially the entire distance to said front end of said body whereby full lateral support is provided also at the front end portion of said hollow body;

said sleeve having an end face remote from said region of said jaws and facing away from said front end; and, a gear formed on said end face for coacting with the chuck key to rotate said sleeve for tightening said jaws on the tool.

2. The chuck of claim 1, said body having a circular groove formed in the outer surface thereof; said thread means including:

a collar forming part of said sleeve and located in said groove; and said second thread means being formed on the inner wall of said collar.

* * * * *